United States Patent [19]
Behr et al.

[11] 4,131,924
[45] Dec. 26, 1978

[54] FLEXURE MOUNTED MAGNETIC HEAD POSITIONER FOR HIGH-SPEED TRANSLATION

[75] Inventors: Michael I. Behr, S. Pasadena; Ko K. Gyi, Thousand Oaks; Wilfred D. Iwan, Sierra Madre; Joseph C. Palotay, Newbury Park, all of Calif.

[73] Assignee: Burroughs Corporation, Detroit, Mich.

[21] Appl. No.: 838,961

[22] Filed: Oct. 3, 1977

[51] Int. Cl.$^2$ .................... G11B 5/56; G11B 21/24
[52] U.S. Cl. ............................ 360/106; 360/77; 360/105
[58] Field of Search .......... 360/106, 105, 109, 107, 360/104, 77, 78, 75; 179/115.5 VC, 115.5 PV

[56] References Cited
U.S. PATENT DOCUMENTS

| | | | |
|---|---|---|---|
| 3,548,392 | 12/1970 | Walstrom et al. | 360/106 |
| 3,827,081 | 7/1974 | Prieur | 360/105 |
| 3,886,595 | 5/1975 | Swaim et al. | 360/106 |
| 4,058,844 | 11/1977 | Dirks | 360/106 |

*Primary Examiner*—Alfred H. Eddleman
*Attorney, Agent, or Firm*—John J. McCormack; Nathan Cass; Kevin R. Peterson

[57] ABSTRACT

Data is recorded on a magnetic recording disk with data transducers adjustably positioned relative to respective "data zones," each zone comprising a prescribed number of adjacent data tracks. A family of such transducers may be mounted together as a unitary recording head which is positionable radially over an excursion approximating the width of the (multi-track) data zones. A typical head reciprocation excursion approximates from one dozen to several dozen mils; thus, the heads are aptly mounted on flexure pivots and reciprocated directly by electro-magnetic means which are mechanically isolated from the head array.

13 Claims, 5 Drawing Figures

FLEXURE MOUNTED MAGNETIC HEAD POSITIONER FOR HIGH-SPEED TRANSLATION

FIELD OF THE INVENTION

The present invention relates in general to magnetic recording equipment and more particularly to improved techniques and apparatus for positioning magnetic recording transducers.

BACKGROUND, FEATURES OF DISCLOSURE

An important and integral part of the peripheral equipment supporting present-day digital computer systems is the magnetic memory equipment commonly used to store data at terminal facilities. One familiar form of such equipment is a disk file comprising a number of rotating disk surfaces, with concentric tracks on which signals are magnetically recorded and associated magnetic transducers arranged to confront one (or several) of these surfaces for writing and reading.

Workers in the disk file art will recognize that where early disk files operated according to a "core-per-track" mode or a "core-per-surface" mode, an intermediate mode, more recently suggested, involves a "core-per-zone" mode — whereby each core "covers" a prescribed number of adjacent disk tracks and is translated across these relatively quickly and efficiently. Typically, a multi-core head, involving about one dozen heads, may be assembled and mounted as a low-mass load apt to be quickly and very accurately reciprocated across this excursion distance — typically the order of 20 to 30 mils, with each core typically swept across about 30 to 50 adjacent tracks.

This presents a miniaturized, multi-core head which may be independently mounted and separately actuated; being characterized as a "core-per-zone" arrangement, better understood by reference to U.S. Pat. No. 3,686,649 to Behr and U.S. Pat. No. 4,007,493 to Behr et al.; these being hereby incorporated herein by reference.

Now, such transducer heads which are to be translated over relatively short distances — on the order of 20 or 30 mils — usually place a premium on access-speed and accuracy. According to one feature of this invention, it has been found useful to mount such heads on flexure pivots and actuate them directly, with electro-magnet motive means, like a voice-coil, which are field-coupled only, not mechanically coupled. Voice-coils and flexure pivots are made for such short excursion distances; also, they can accommodate the very fast acceleration (low mass) necessary for fast accessing speeds and can operate at the relatively low power, with low-mass, that is optimum for such disk file equipment.

As workers in the art well know, such transducers (recording heads) must be brought very closely adjacent the rapidly-rotating disk surface for effective transducing operations. Thus, head/disk clearance is very, very small, as are the separations between recording tracks. And, as workers recognize, the mounting/positioning arrangement for such heads must be extremely stable, as well as being positionable very fast yet with great accuracy and reliability. That is, it is obviously critical that a head be mounted and translated very quickly and precisely as it is shifted radially from track-to-track across a disk. Otherwise, writing and reading cannot be performed reliably enough and/ or fast enough. THis invention is intended to improve upon known head positioning arrangements, and especially access speed.

Now, workers recognize that the recording track density of present day magnetic recording disks must be increased; for instance, the recording tracks should be spaced closer together where possible. Of course, this makes head positioning ever more difficult. Typically, a recording head unit will present a plurality of individual magnetic transducers, each for recording on an individual magnetic recording track. Because of the tight positioning tolerances, the recording tracks are typically "interlaced" between recording heads to save space. But, with such interlacing, the heads must be positioned and centered very precisely to avoid "cross-talk" between adjacent tracks.

Workers will recall various arrangements commonly known in the art for track positioning of magnetic heads — e.g., with mechanical arms driven by electrical actuators or by levers and cams, etc., or by pneumatically-actuated diaphragms, or with related hydraulic means, and so forth. These and related features are described and/or referenced in U.S. Pat. Nos. 3,864,749, 3,696,351 and 3,320,599.

Systems according to the present invention contemplate such arrangements whereby a multi-head mount is adapted to be translated with great precision and speed across the surface of a magnetic disk, these involving improvements adapted to enhance the storage capacity and decrease the data access time in disk file equipment but at relatively low cost per byte.

In one particular embodiment, a head mount is supported by flexure-spring means for pivotal translation by an electromagnetic actuator system (e.g., a voice-coil actuator, or a pair of them). Such systems will be seen as highly effective; allowing fast, precise translation over short excursions, yet doing so in a low-mass, low-power system — one permitting the heads to be actuated independently, while eliminating the friction associated with prior art mechanisms. Positioners according to the invention will be recognized as very convenient and versatile to use, the actuator components being commonly available, as well as disposed to be readily accessible and replaceable. It will accommodate tandem positioners, such as a "dual, in-line" actuator arrangement disclosed below. Such systems will also be seen as apt for use in conjunction with a "track-on-data" servo arrangement.

By comparison, conventional positioners are more complex and less efficient — typically involving a head mount suspended, by a spring system, on a rigid base member which is moveably disposed in slide-ways or the like — and, usually, supported by bearings as well. The performance of such positioning systems leaves something to be desired in several respects. For instance, conventional "linear" positioning actuators, having an excursion on the order of several inches, are relatively slow — having an (average) actuation time on the order of 25–50 MS and requiring hundreds of watts of power — in some cases exceeding a kilowatt. With earlier disk files, actuation power was obtained hydraulically, further limiting response time and operating characteristics.

BRIEF DESCRIPTION OF THE DRAWINGS

The foregoing and other features and advantages of the present invention will be better understood by consideration of the following detailed description of presently preferred embodiments, especially when considered in conjunction with the accompanying drawings therein.

DETAILED DESCRIPTION OF THE EMBODIMENT

Figure 1:
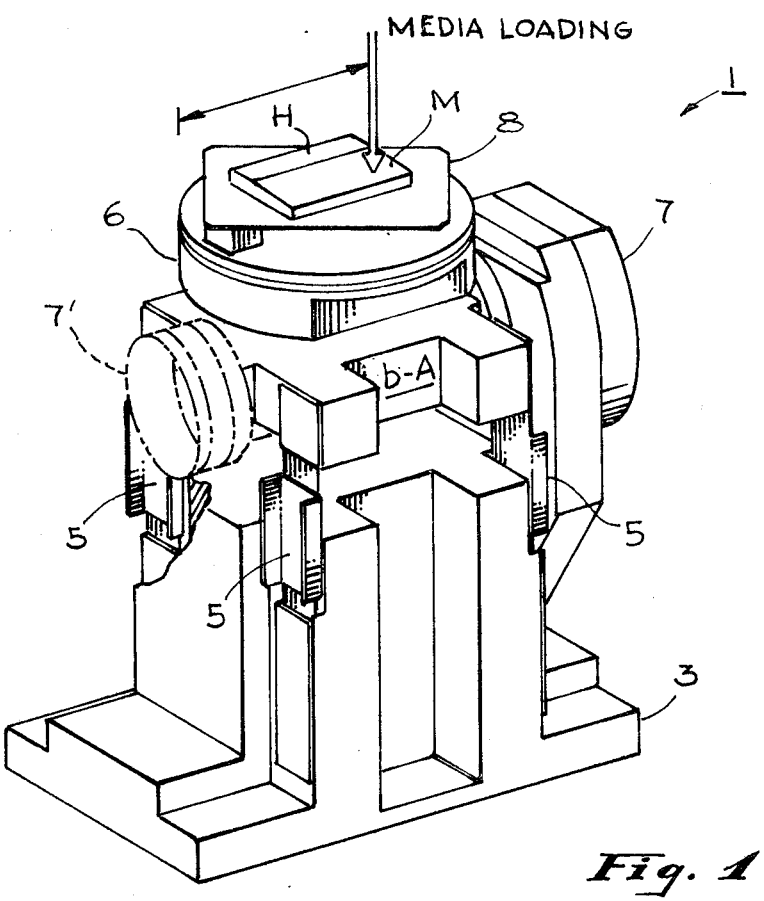
FIG. 1 is an upper perspective view of a head positioner embodiment according to the invention.

FIG. 1 illustrates, schematically, a head positioning assembly 1 adpated for use in a magnetic disk file arrangement as generally understood by those skilled in this art. Assembly 1 is constructed, according to the principles of this invention, to present its recording transducers on a support mounted on flexure strips and adapted for reciprocating translation over a prescribed track by simple electro-magnetic thrust means.

As illustrated in this presently preferred embodiment, a magnetic head array H will be understood as affixed upon a relatively compact, light head mount M, suspended by a known gimbal system 8, upon a head block 6. As better viewed in FIG. 4, block 6 is adapted to be reciprocated in the direction of the arrows by an integrated magnet/voice-coil assembly 7 (or by an opposed pair of them — note companion voice-coil 7' in phantom), in a known manner.

Workers will recognize that such electro-magnet reciprocation is intended to translate one, or a set of, magnetic transducers in the head array H across a prescribed track-zone of an associated recording medium — e.g., in operative transducing relation with associated recording tracks on a rotating magnetic disk. The head structure and the associated mounting arrangement will be understood, according to one feature, as exhibiting "bi-axial resilience." Thus, head assembly H is mounted on mount M for resilient "vertical reciprocation" (e.g., vs. disk D in FIG. 2), as well as for transverse resilient "horizontal reciprocation" (e.g., parallel to the recording surface of disk D in FIG. 2). This "horizontal reciprocation" will be understood as effected by voice-coil assembly 7, thrusting head block 6 pivotingly against the resilient urging of a set of flexure mounts — here indicated as four flat flexure strips 5. Strips 5 will be understood as comprising any known (e.g., spring steel) flexure strips, attached to the four corners of block support 6-A, being fastened at their other end to associated portions of a rigid mounting block 3 (to form the overall improved head positioner assembly 1). This will be understood as allowing resilient reciprocation in the direction of the arrows (e.g., order of ± 25 mils) while being stiff and rigid in the transverse direction — resisting twist, etc.

Here, the actuation and head translation will be understood as effected by a small voice-coil (permanent magnet) assembly 7, which, according to this feature, is constructed to form an integral part of the head mount assembly. Workers will recognize that the proposed flexure support means (two flexure springs on each side of mount 6-A) — provide an inherently resilient, stable pivot-spring mount, whereon the translations across the small excursion contemplated in such a head positioning system may be understood as essentially parallel to the disk surface confronting the head H, as known in the art.

After the disk has been brought up to operating speed, the recording heads will be pressed toward the disk surface by engagement means, such as a pneumatic thrust means, as known in the art and illustrated for instance, in the referenced U.S. Pat. No. 3,320,599.

Figure 2:
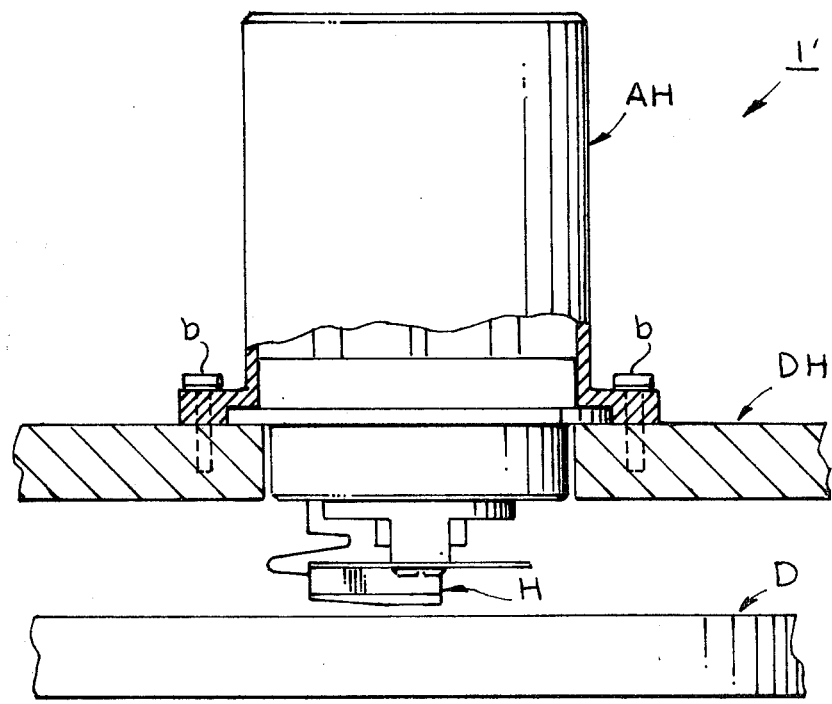
FIG. 2 is a side elevation, partly in section, of a related positioning arrangement showing the position of the heads relative to the magnetic recording disk.

A like assembly 1' is shown in side view in FIG. 2 with the head H affixed on the file DH (bolts b), in housing AH, the head H in confronting relation with the related surface of a magnetic disk medium D. The assembly is shown, broken away, in FIG. 3. The head mount M will be understood as to be actuated "vertically" against the medium D, by a known fluid thrust means; preferably a pneumatic actuator system as here illustrated fragmentarily and known in the art; this including a source of pressurized gas (not shown), selectively applied, via delivery tube PT, to drive a piston PA which is coupled to actuate mount M — the gimbal spring suspension (g, FIG. 4) affording a spring-return, as known in the art.

Figure 3:
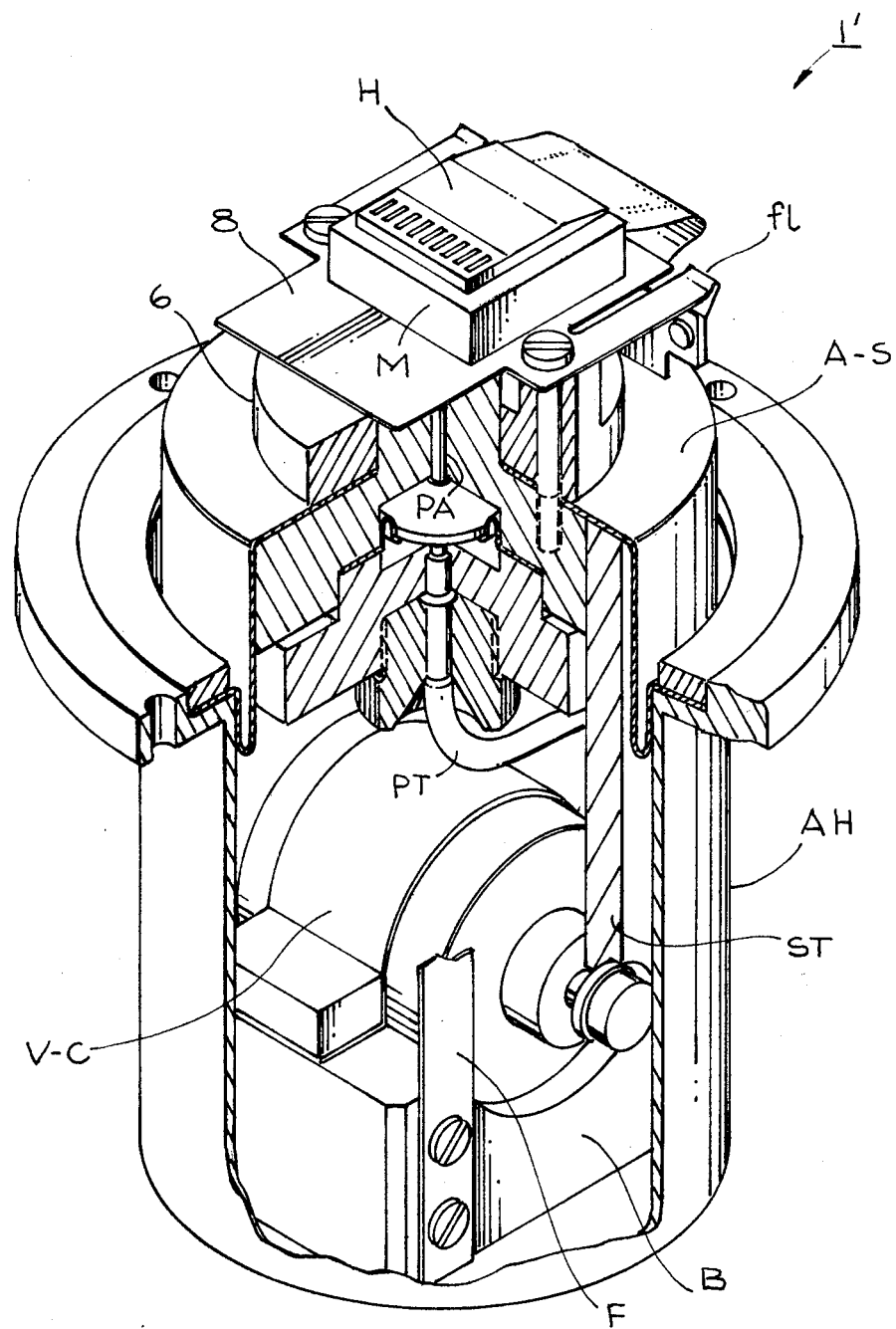
FIG. 3 is an upper perspective view, partly cut away, of a second embodiment similar to that in FIG. 1, but including an outer housing and associated dust-seal.

In the modified embodiment 1' of FIG. 3, and FIG. 2, it will be apparent that such a positioner assembly may be "sealed." That is, the actuator system may be enclosed in an actuator housing AH, with the head-mounting block (6, etc.) and cylindrical housing "yieldingly" (reciprocatingly) attached to an intermediate "diaphragm seal" A-S. Dust seal A-S will be understood to accommodate the reciprocation of the head mount during "track-select" operation as known in the art, while yet maintaining the desired dust-seal, preventing the entry of dirt particles, dust and other contaminants. Housing AH will be seen as conventionally mounted to a housing, or like fixed portion DH of the disk drive through mounting bolts b, or the like, as known in the art.

The gimbal 8 will be understood as conventional, being designed for minimum yaw, and being disposed close to the plane of the head mount's "center-of-mass" — thereby minimizing "roll" and unwanted oscillation. Now, gimbal 8 is attached to the gimbal block 8-B (FIG. 4) which, in turn, is mounted upon the head block 6, cantilevered above a fixed base 3 (on the drive's frame) on the four flexure arms 5. The gimbal spring is constructed and operated as known in the art; for instance, preferably being similar to that shown in the cited U.S. Pat. No. 3,864,749. The gimbal will be seen to accommodate the desired resilient vertical actuation of head H, toward and away from the disk medium (an "up and down" excursion in this view) by the mentioned fluidic (pneumatic) thrust means. Such means are well known in the art and need not be detailed here. Thus, head H will be understood here as resiliently biased against the medium being pneumatically urged, and spring-returned for "flying" contact with the disk surface during transducing operations. Alternatively, constant-contact modes may also be contemplated (as below).

It will be apparent that the lateral ("Track-Select") translation of the head array (i.e., of support block 6) will likewise be resiliently controlled under the urgings of the voice-coil actuator 7, (indicated by the double-ended arrow), with spring-return bias applied by the flexures. This translation may be understood as effectively, maintaining the cores relatively parallel to the (disk) recording surface, despite the pivoting action.

This is partly because the pivoting excursion is so small and the flexure support arms 5 so relatively long — and also because a compensatory vertical shift is provided, by the pneumatic actuator (or like means). As workers can see, such a pivoting translation would normally displace the head cores perceptibly away from transducing contact with the disk surface (especially at the pivoting extremes). Thus, the pneumatic thrust arrangement will be understood as preferably arranged, controlled and operated to compensatorily thrust the heads toward the medium to the extent the pivoting carries them away — being controlled to effect this "planar pivoting" translation by means known in the art.

In summary, workers will perceive several advantages and novel features in such a "bi-axially-resilient," flexure-pivoted positioning arrangement. The effect is to minimize the mass of the transducer array which must be reciprocated across the medium and to resiliently isolate it, as well as to spring-mount the support carrying the transducers so it may be freely pivoted during translation (de-coupling it, in turn, from the rest of the positioner) — using the vertically-resilient thrust system to compensate for core-medium separation resulting from the pivoting, by the fluidic thrust system and thus, effectively, maintain "coplanarity" between record and head. The balancing of the spring constants and the excursion-distances, etc., involved will be apparent to workers from the indicated results with this embodiment. Here, the flexures have been used comprising beryllium copper about 2" × ⅜" × 0.010", carrying a mass of a fraction of a pound (block, mount, etc., these being driven by voice-coil 7).

Results:

Such a "bi-axially-resilient" arrangement may be advantageously used to translate a multi-unit head mount relatively quickly over short distances; yet using simple and inexpensive components. For instance, a 10-core head may be swept across about 600 disk tracks (about 60 tracks per head) over an excursion of about 90 mils in a relatively brief access time (e.g., 5–20 MS, worst case). Such an arrangement will be recognized as very versatile and apt for use in mounting a plurality of such multi-core assemblies — for instance, four such (10-core) assemblies covering a total of about 2400 tracks — yet apt for quick, precise translation.

Various combinations of preferred actuation distance and response time may be contemplated. In this embodiment the head is preferably translated over a relatively small excursion (e.g., ± 25 mils — across disk tracks), with an average access time of about 5 MS (milliseconds) and requiring less than about 5 watts of power.

Workers will quickly recognize how simplification and improved reliability result from such a system. For instance, the flexure supports of block 6, etc., eliminate all contact points, abrading surfaces, etc., (such as with slides or bearings) in the translated load. Also, this system configuration enhances maintainability, repairability and easy replacement of the mount — especially when used in conjunction with a voice-coil actuator and gimbal-mounted fluidic actuator for the head, for such "mil-order" excursions.

Such an arrangement can facilitate a high capacity, fast access, inexpensive disk file; for instance, where about two dozen megabytes per disk may be stored, with an average access time of a few milliseconds or less.

Figure 4:
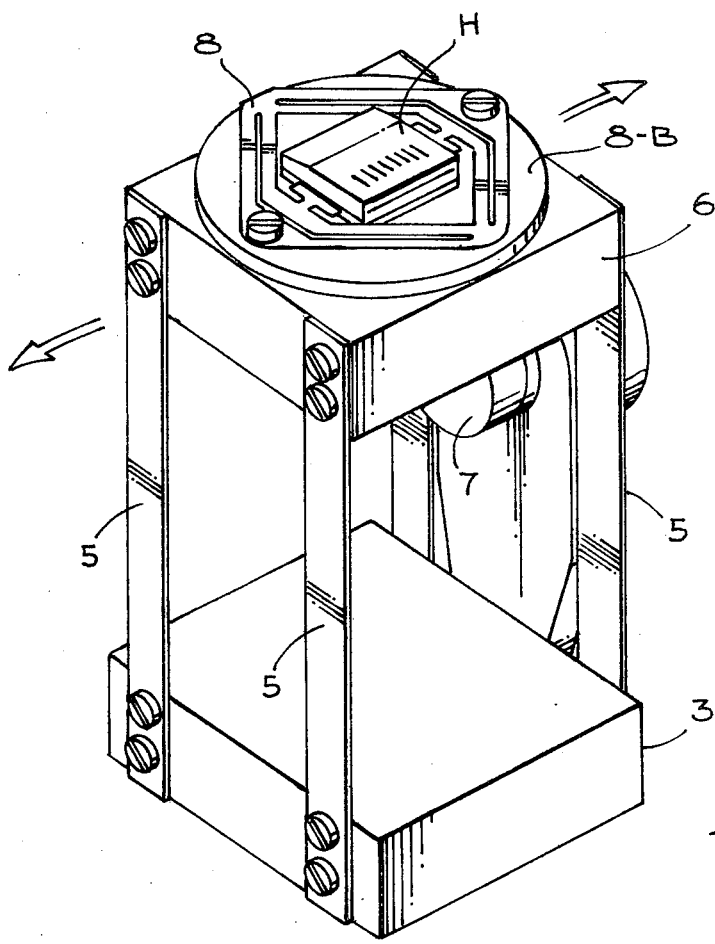
FIG. 4 is an upper perspective view of an embodiment like that of FIG. 1, but somewhat simplified for clarity.

"Off-center" actuation (FIG. 3):

In FIG. 3, embodiment 1' will be recognized as involving an "off-center" actuator-load relation (as opposed to the embodiment of FIGS. 1 and 4). Here, head array H is, again, pivotably mounted on two opposed pairs of flexure spring arrangements, and is adapted to be selectively urged into disk contact by fluidic thrust means. That is, four flat flexure spring strips F will be understood as mounted from a rigid base B and cantilevered upward to interconnect supportingly, at their distal end, with head block 6.

As mentioned, a pneumatic system, including piston assembly PA and an associated souce of pneumatic power, selectively applied (known in the art, but not detailed here) is used to urge transducing relation. However, here, the head-translating means (voice-coil actuator V-C) is disposed "out-of-line" with its load — i.e., not aligned to actuate along, or close to, the path of the support's center-of-mass, as opposed to the embodiment in FIG. 1. Coil V-C is adapted to translate the head mount H laterally across disk tracks, through an intermediate support strut ST. However, this disposition is less preferred, in part because of oscillations, etc., introduced by such "off-line" coupling (e.g., strut ST can be distorted somewhat by this), as workers will appreciate.

Figure 5:
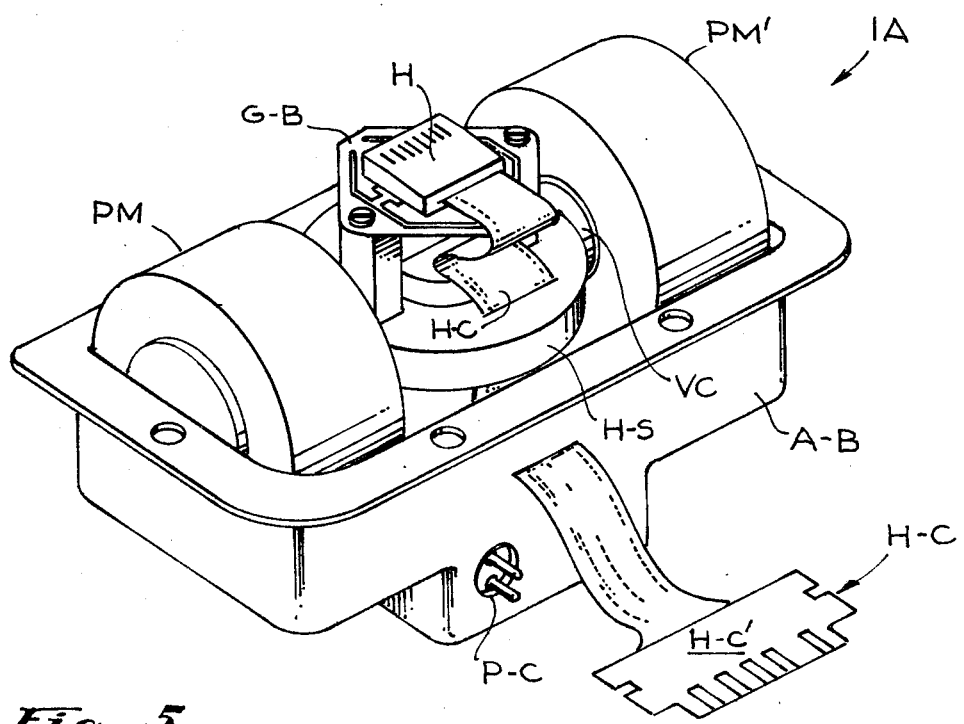
FIG. 5 is an upper perspective view of another embodiment indicating a dual drive, in-line actuator system.

Dual-actuator, FIG. 5

Workers in the art will recognize that systems according to the invention, as above described, may be modified in various ways, while still retaining some or all of the mentioned features and advantages.

For instance, as suggested above, two actuator systems — rather than one — may be employed for "track-select", to sweep the head block across the recording medium from track-to-track. This is illustrated for embodiment 1-A in FIG. 5 (understood as operating as above except where otherwise specified). Here, a head unit H will be understood as mounted upon a gimbal block G-B, which, in turn, is mounted upon a head support block H-S. Block H-S is to be reciprocated by a pair of voice-coil/permanent magnet units (see magnets PM, PM' and associated voice-coils, with only one coil, V-C being evident in this view). The head block H-S will be understood as mounted on a pair of opposing flexure spring means for this reciprocation, being thereby projected above the rigid enclosure AB, understood as to be coupled to the disk file frame. Various conventional, known accessories such as electrical connection means, head connector strips HC, HC' and voice-coil power/control connector input, P-C are also indicated, or will be understood. Those skilled in the art will readily recognize that this arrangement is constructed and operated as the above embodiments, except as otherwise described.

Workers will appreciate that using two opposed voice-coil actuators, in tandem, (rather than a single such actuator) will afford certain special advantages for translating the head across a magnetic medium. Such an actuator pair may be operated in a "push-pull/pull push" mode. Also, such a "dual, in-line" positioner is more efficient thermally, providing increased cooling surface area for the voice-coil/magnet assembly and reducing the load on each voice-coil unit. The magnetic actuator structures here will be understood as designed and operated to eliminate any significant harmful interaction (e.g., magnetic interference) with the magnetic information recorded on the media (disk). Of course, similar arrangements are also feasible, in certain cases, for drum, tape or floppy disk media, as will be contemplated by those skilled in the art.

Workers in the art will also recognize that this embodiment affords advantages and critical design features whereby undesireable mechanical resonance effects may be controlled, if not eliminated — e.g., oscillation effects associated with oscillating various elements of the housing, the supports, the various flexures and other linkages, etc. This will be especially true when such devices are used in a "closed-loop" servo system, where such mechanical resonances can upset the smooth, uninterrupted translation of the head unit from track-to-track, no matter what the frequency or amplitude of translation.

In one modification of the foregoing, the cores may, themselves, be mounted on flexure springs to "slide" in constant contact across the disk as opposed to being selectively thrust (by the pneumatic means suggested above or otherwise) against the recording surface. The bi-directional resilience of the flexure mounting means according to the invention is apt for accommodating such a mounting. Also, a multi-core head may take the form of a set of cantilevered "fingers," rather than the mounting of cores radially "in-line," as described above and in the cited patents. Moreover, in certain instances, the flexure-pivot-mounted array may comprise a vertical "stack" of such cantilevered mounting arms, presenting their cores operatively adjacent superposed recording disks (transducing one or both surfaces between the disks, and preferably in constant spring-mounted contact with the disks).

Workers will appreciate many advantages and novel features of such systems according to the invention. For instance, they are especially apt for accommodating a simplified, low-mass, quick-response head positioner, especially over the short excursion distances characteristic of such "core-per-zone" arrangements — especially where a set of heads is to be translated together by relatively convenient actuation means, such as a voice-coil magnet combination — more especially where such is to be done at low power and relatively economically, using conventional, readily-available components — and more especially where one desires aptness and convenience of repair, replacement or inspection of a positioner arrangement — more especially with a second degree (vertical) of head-mount resilience to accommodate maintainance of core-media coplanarity.

The flexure spring mountings for such a positioner will be seen as especially apt for use with such fast-response, simple, reliable systems — eliminating the mass and the friction associated with conventional bearings, sliders, pivot points, etc., and having virtually infinite life (as long as used within excursion limits, as known in the art). Such designs will be understood as accommodating multi-head units and/or the use of multiple actuator means in a single unit. Also, they may be advantageously combined with a "track-on-data" servo system adapted to derive servo positioning data from the medium itself and to responsively control the servo head positioning system to quickly adjust the transducers centered over selected recording tracks.

It will further be understood that the preferred embodiments described herein are only exemplary and the invention is capable of many modifications and variations in construction, arrangement and use without departing from the spirit of the invention as claimed herein. For example, the means and methods disclosed herein are also applicable to drum systems as well as tape systems and the like and to rigid disks, as well as flexible disks. Other modifications may also be invoked; for instance, each mentioned pair of flexures may, in appropriate instances, be replaced by a single wide flexure band, as known in the art.

Since the foregoing examples of the invention are only illustrative, it will be appreciated that this invention is to be considered as including all possible modifications and variations coming within the scope and spirit of the invention as defined by the appended claims.

What is claimed is:

1. In an improved head positioner arrangement for a disk drive apparatus, this arrangement including at least one head block presenting a plurality of multi-track transducer cores for operative disposition with a prescribed magnetic disk recording surface, said block(s) being mounted on first spring means and arranged and adapted to be resiliently reciprocated in a first direction, toward and away from such a surface in transducing relation therewith and further being arranged to be reciprocated, in a second direction, transverse said first direction, from track-to-track, over a prescribed "track-select" excursion distance, radially, across the disk surface; the arrangement also including head support means carrying this head block; the combination therewith comprising:

opposed flexure pivot means, mounting said support means pivotably from said disk drive apparatus, the pivot means being selected and arranged to accommodate said track-select excursion, resiliently in said second direction; and electro-magnet actuator means mounted on said drive apparatus and coupled to said support only electrically — and not mechanically — whereby to selectively pivot the support means over said excursion distance, reciprocatingly and against the return bias of said flexure pivot means;

said first spring means being, further, adapted and operated to compensate for any shift of said block in said first direction which may be caused by so pivoting said support means in said second direction.

2. The combination as recited in claim 1, wherein said electro-magnet means is disposed at, or relatively close to, the center-of-mass of its load comprising said support means and the head block thereon.

3. The combination as recited in claim 1, wherein an opposed pair of such electro-magnet actuator means are disposed, in-line, on opposing sides of said support means and adapted to so pivot and reciprocate the support means during "track-select."

4. The combination as recited in claim 1, wherein said electro-magnet means comprises at least one voice-coil actuator arrangement.

5. The combination as recited in claim 4, wherein said flexure spring means comprises at least one pair of flexure spring strips on opposing sides of said support means.

6. The combination as recited in claim 5, wherein said excursion distance is on the order of from several thousandths to several hundreths of an inch, said flexure strips and said voice-coil actuator being adapted accordingly.

7. The combination as recited in claim 1, wherein each said head block is mounted on said support means by spring means adapted to resiliently accommodate record-engaging thrusts normal to said support means; and wherein fluidic thrust means is provided and arranged to selectively thrust said cores in operative transducing relation with said recording surface.

8. The combination as recited in claim 7, wherein said spring means comprises a flexure spring gimbal arrangement.

9. The combination as recited in claim 8, wherein resilient dust-seal means are also arranged between said support means and said supporting portions of the drive apparatus.

10. In an improved magnetic recording system including at least one rotatable magnetic memory disk and an associated disk drive array, with magnetic recording transducer-assembly means mounted therein, each said assembly comprising at least one recording head block, each head block carrying a plurality of transducer cores adapted to cooperate with respective recording tracks on surface portions of said disk when thrust operatively adjacent thereto; the combination therewith comprising:

head support means arranged to carry said blocks;

spring means mounting said head block on said support means so as to flexibly accommodate the thrusting thereof toward and away from said recording surface, presenting said cores into, and out of, operative transducing relation with associated portions of said surface;

flexure pivot means mounting said support means pivotably from a fixed portion of said drive array so as to be resiliently pivotably reciprocated along a prescribed multi-track translation path in a "track-seek" operation; and electro-magnet positioner means mounted on said drive array in operative adjacency with said support means and adapted to selectively and controllably reciprocate said support means along said path to effect "track-seek."

11. The combination as recited in claim 10, wherein said positioner means comprises a reciprocating thrust member mounted on said array and adapted to be selectively thrust to reciprocate along a prescribed path, plus associated actuator means arranged and adapted to be drivenly engaged by said thrust member when reciprocated along said path for controlled reciprocation of said support means.

12. The combination as recited in claim 11, wherein said support means is also adapted to be reciprocated toward and away from said surface by piston means selectively driven by pneumatic means.

13. The combination as recited in claim 1, wherein said electromagnetic actuator means is disposed "off-line," relatively remote from said head block; and wherein said support means is coupled to said actuator means electromagnetically through associated coupling-arm means.

* * * * *